(12) United States Patent
Semel (10) Patent No.: US 7,392,900 B2
(45) Date of Patent: Jul. 1, 2008

(54) PACKAGE FOR TRANSPORTING A FRAGILE ARTICLE

(75) Inventor: Sandra G. Semel, Lebanon, OH (US)

(73) Assignee: Pakmark, LLC, Fairfield, OH (US)

( * ) Notice: Subject to any disclaimer, the term of this patent is extended or adjusted under 35 U.S.C. 154(b) by 477 days.

(21) Appl. No.: 10/917,010

(22) Filed: Aug. 12, 2004

(65) Prior Publication Data

US 2006/0032766 A1    Feb. 16, 2006

(51) Int. Cl.
*B65D 85/30* (2006.01)
*B65D 81/02* (2006.01)
*B65D 25/54* (2006.01)

(52) U.S. Cl. ............... 206/307; 206/308.1; 206/587; 206/588; 206/775; 206/303

(58) Field of Classification Search ............... 206/303, 206/307, 308.1, 445, 449, 454, 455, 775–778, 206/485, 784, 587, 588, 316.1
See application file for complete search history.

(56) References Cited

U.S. PATENT DOCUMENTS

| | | | | |
|---|---|---|---|---|
| 2,582,476 A | * | 1/1952 | Buttery | 206/777 |
| 3,211,282 A | * | 10/1965 | Hennessey | 206/590 |
| 4,313,540 A | * | 2/1982 | Hart et al. | 206/588 |
| 5,121,838 A | * | 6/1992 | Dickie | 206/454 |
| 5,529,187 A | * | 6/1996 | DeNola | 206/449 |
| 6,105,759 A | * | 8/2000 | Fuchs et al. | 206/218 |

* cited by examiner

*Primary Examiner*—J. Gregory Pickett
(74) *Attorney, Agent, or Firm*—R. William Graham (57) ABSTRACT

A package for storing a fragile article includes a plurality of panel integrally connected to one another a fold lines. Pairs of two of the panels oppose one another in a spaced relation wherein the panels form a partial enclosure. A first tab connects to about an open end surface of the enclosure and has a slotted surface formed therein which provides a first retention surface for a portion of the article. A second tab connects about second open end surface and has a shelf with a slotted surface formed therein which provides a second retention surface for another portion of the article and a complete enclosure is so formed wherein the article is retained in suspended manner in a spaced relation from each of the panels.

16 Claims, 6 Drawing Sheets

PACKAGE FOR TRANSPORTING A FRAGILE ARTICLE

BACKGROUND OF THE INVENTION

The present invention relates generally to packages for shipping compact discs and other fragile articles through the mail, and more particularly to an inexpensive yet protective package for shipping compact discs.

Optical storage media need safe, inexpensive, reliable and environmentally-friendly containers in which to protect such media during storage and transport. Currently, packages for storing and transporting compact discs (CDs), digital variable discs (DVDs) and related optical storage media includes a hinged, optically transparent plastic container and one or more printable inserts to identify the contents of the media, known as a jewel case. A central hole in the media frictionally engages a complementary pedestal that includes resilient members that extend from one of the inner surfaces of the container.

Paper inserts are inserted into the cases to display the information within the case. Jewel packages have been a popular choice in satisfying some of these needs due in part to their ability to prevent contact between the data-containing portion of the disc and the adjacent container wall, in effect suspending the disc away from its connection point at the resilient pedestal. Such cases have drawbacks in manufacturing costs, as additional raw materials, both paper and plastic are required and shipping can become prohibitively expensive, especially when multiple units are being shipped. Further, addition of large quantities of non-degradable plastic packaging to landfills and consequent impact on the environment also deter against conventional jewel package use as a media container. Similarly, due to the inability of conventional plastics, with nonporous surfaces and low surface tensions to hold printing inks, large quantities of paper are typically consumed to provide surfaces upon which information germane to the data on the disc can be placed. The manufacture of a separate insert for printed text, graphics and related information (collectively referred to herein as printed indicia), which is necessary to provide the user with information pertaining to the disc and its contents, constitutes a significant part of the overall package. Many additional steps are required to prepare, print and package these inserts to ensure compatibility with the jewel package. This drives up packaging costs and has adverse effects on the environment as additional sheets of printed material must be included in the packaging of the disc.

To alleviate some of these concerns, prior art efforts have created jewel packages out of paper products and similar printable materials or made the packages out of different types of plastics. While the prior art solves some of the safety and environmental concerns, the current art remains comparatively expensive to manufacture, as multiple separate components must be assembled, or numerous cutting, folding and adhesion steps are required. Paper-based devices have stressed the need for containers that permit printed matter to be placed directly on the disc container.

The nature of these devices has thus far not been acceptable due to unwanted contact with a media side of the disc as well as the inability of the container itself to withstand repeated storage and shipping use. Thus, a need exists for a jewel package that is inexpensive to manufacture, including the ability to accept text and graphics printed directly on the surface of the package. A further need exists for a package that can satisfy the aforementioned needs within the confines of article protection, reduced environmental impact and expense considerations.

SUMMARY OF THE INVENTION

These needs are met by the present invention, whereby a package for storing a fragile article is provided. The package includes a first panel, a second panel integrally connected to the first panel along a first fold line, a third panel integrally connected to the second panel along a second fold line, a fourth panel integrally connected to the third panel along a third fold line, the fourth panel fixably connected to the first panel such that the first panel and the third panel oppose one another in a spaced relation wherein the panels form a partial enclosure having a first open end surface and a second open end surface. A first tab connects to the first open end surface and has a shelf with a slotted surface formed therein which when the shelf extends inside of the partial enclosure provides a first retention surface for a portion of the article. A second tab connects to the second open end surface and has a shelf with a slotted surface formed therein which when the shelf extends inside of the partial enclosure provides a second retention surface for another portion of the article and a complete enclosure is so formed wherein the article is retained between the shelves in suspended manner in a spaced relation from each of the panels.

The package can preferably be integrally formed in a single die cut. At least one of the panels can include a window through which the article can be viewed. The package can be made of a material which enables direct printing thereon. The window includes a translucent member to prevent entry into the enclosure and thereby protect the article. The first panel and the third panel can be geometrically substantially similar and the second panel and the fourth panel are geometrically substantially similar.

Other advantages and aspects of the present invention will become apparent upon reading the following description of the drawings in conjunction with the detailed description of the invention.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Referring to the drawings, there are several embodiments of the inventions which are designated by the numerals 10, 10' and 10". FIGS. 1A, 2A and 3-5 show one embodiment of the present invention which includes a package 10 for storing a fragile article 12, such as a compact disc. The package 10 includes a first panel 14, a second panel 16 integrally connected to the first panel 14 along a first fold line 18.

Figure 1A:
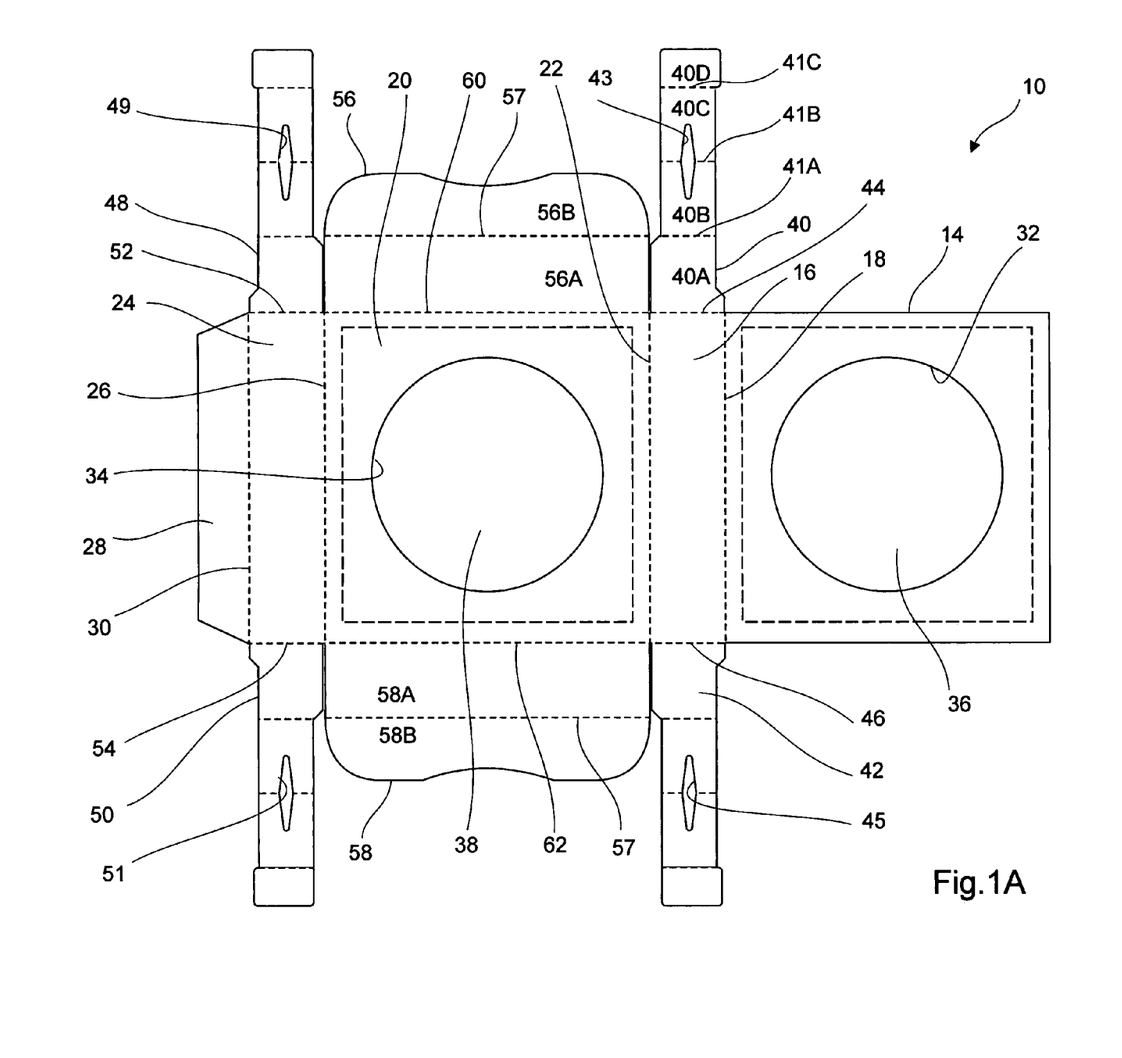
FIG. 1A is a plan view of a first embodiment of the package in an opened configuration.

A third panel 20 is integrally connected to the second panel 16 along a second fold line 22. A fourth panel 24 is integrally connected to the third panel 20 along a third fold line 26. A flap 28 is integrally connected to the fourth panel 24 along a fourth fold line 30.

The first panel 14 and the third panel 20 are geometrically similar here shown to be rectangular and the second panel 16 and the fourth panel 24 are geometrically similar here shown to be rectangular. The panels 14 and 20 are shown to include windows 32 and 34, respectively, through which the article 12 can be viewed. The windows can be of any suitable size for displaying the article 12 in a desired manner. The windows 32 and 34 can include translucent members 36 and 38 which can be connected to the respective panels 14 and 20 by gluing for example. The translucent members 36 and 38 can be made of a suitable plastic material to prevent contact with the article 12.

The second panel 16 has end tabs 40 and 42 which integrally connect to the panel 16 along respective end fold lines 44 and 46. Similarly, fourth panel 24 has end tabs 48 and 50 which integrally connect to the panel 24 along respective end fold lines 52 and 54. End tabs 40 and 42 and 48 and 50 substantially mirror one another and for purposes of simplicity one will be discussed in detail with the understanding that the others are similarly formed. Accordingly, end tab 40 includes an inner portion 40A, intermediate portions 40B, 40C and terminal portion 40D which are integrally connected by fold lines 41A, 411B and 41C, respectively. Inner portion 40A and intermediate portions 40B and 40C can be of equal length for purposes apparent hereinafter. An elongated slotted surface 43 extends across the fold line 41B into each intermediate portion 40B and 40C.

The third panel 20 includes end flap portions 56 and 58 which integrally connect to the panel 20 along respective fold lines 60 and 62. The flap portions 56 and 58 substantially mirror one another and for purposes of simplicity one will be discussed in detail with the understanding that the other is similarly formed. Accordingly, flap portion 56 includes an inner portion 56A and an outer portion 56B which is integrally connected thereto along a fold line 57.

The package 10 can be made of a material which enables direct printing thereon. For example, a paper-based substrate can be used in this regard in bleach form and with opacifiers known to the art. The package 10 can be formed in a single die cut operation.

Figure 5:
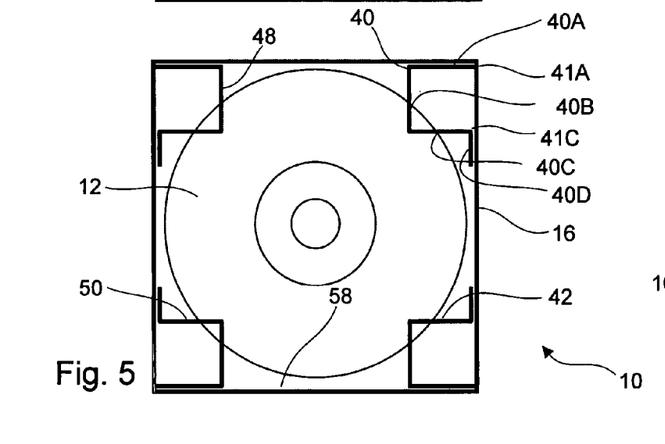
FIG. 5 is a sectional view of the package in FIG. 1A depicting complete insertion of an article with the package in a closed position.

In this embodiment, the terminal portion 40D can be folded over and affixed to the second panel 16 by way of an adhesive material. The fold line 41C should be affixed on the second panel 16 a distance approximately of equal length to intermediate portion 40B from fold line 41A as seen in FIG. 5. The other end tabs 42, 48 and 50 can be likewise affixed to common facing sides to the second panel 16 and fourth panel 24.

Figure 3:
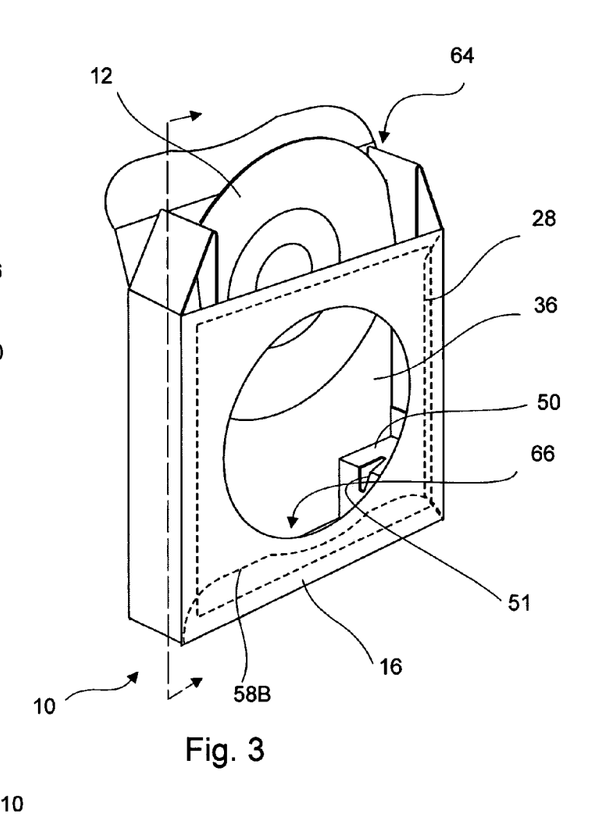
FIG. 3 is a perspective view of the package in FIG. 1A depicting the insertion of an article.

The first panel 14 is then brought into opposing relation to the third panel 20 as seen in FIG. 3. A back side of the flap portion 28 is fixably connected to an inner face of the first panel 14 by adhesive such that the first panel 14 and the third panel 20 as well as second panel 16 and fourth panel 24 are fixed in an equidistantly spaced opposing relation to one another, respectively, and wherein a partial enclosure is thus formed having a first open end surface 64 and a second open end surface 66. At this point, the tabs 40, 42, 48 and 50 are positionable within the partial enclosure.

Figure 4:
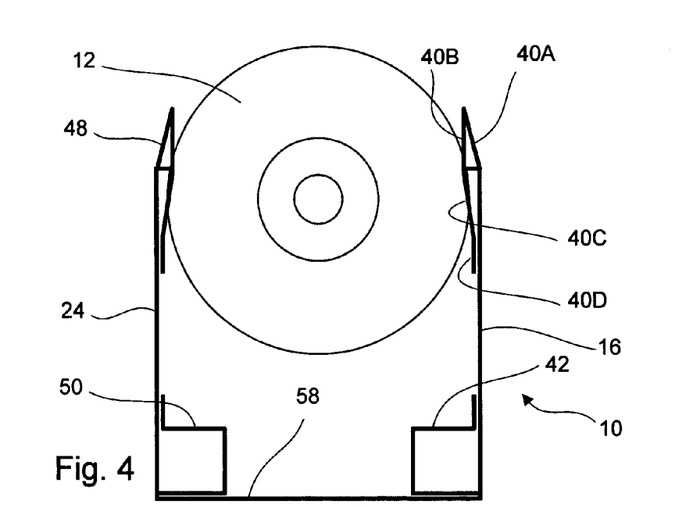
FIG. 4 is sectional view of the package in FIG. 1A depicting the insertion of an article.

Tabs 42 and 50 can be positioned in a seat position to form a shelf with their slotted surfaces 45 and 51 formed therein as seen in FIGS. 2A, 3, 4 and 5 to provide a first retention surface for a portion of the article 12. Outer portion 58B inserts about and between the tabs 42 and 50 and the inner face of the first panel 14 where the inner portion 58A contacts the tabs 42 and 50 thus providing an element of structural rigidity to the package 10 and closes open end surface 66. The article 12, such as a disc, can be inserted past collapsed tabs 40 and 48 as seen in FIGS. 3 and 4, and inserted into slotted surfaces 43 and 49 of respective tabs 42 and 48. Subsequently, the tabs 40 and 48 can be pressed into a seat position wherein their respective slotted surfaces 43 and 49 forming another shelf to retain the article 12 in a suspended manner in a spaced relation from each of the panels 14, 16, 20 and 24 as well as flap portions 56 and 58. The outer portion 56B of flap portion 56 can similarly be inserted about and between tabs 40 and 48 and inner face of first panel 14 to provide another element of structural rigidity to the package and close open end surface 64. With this, the article 12 is completely enclosed in a safe manner in a suspended relation within the package 10. In the case where the article 12 is a media disc for example, the tabs 40, 42, 48, and 50 and respective slotted surfaces 43, 45, 49 and 51 can be of a size such that only a small portion of the periphery of the disc is held thereby assuring that the media is not contacted by any part of the package 10.

Figure 1B:
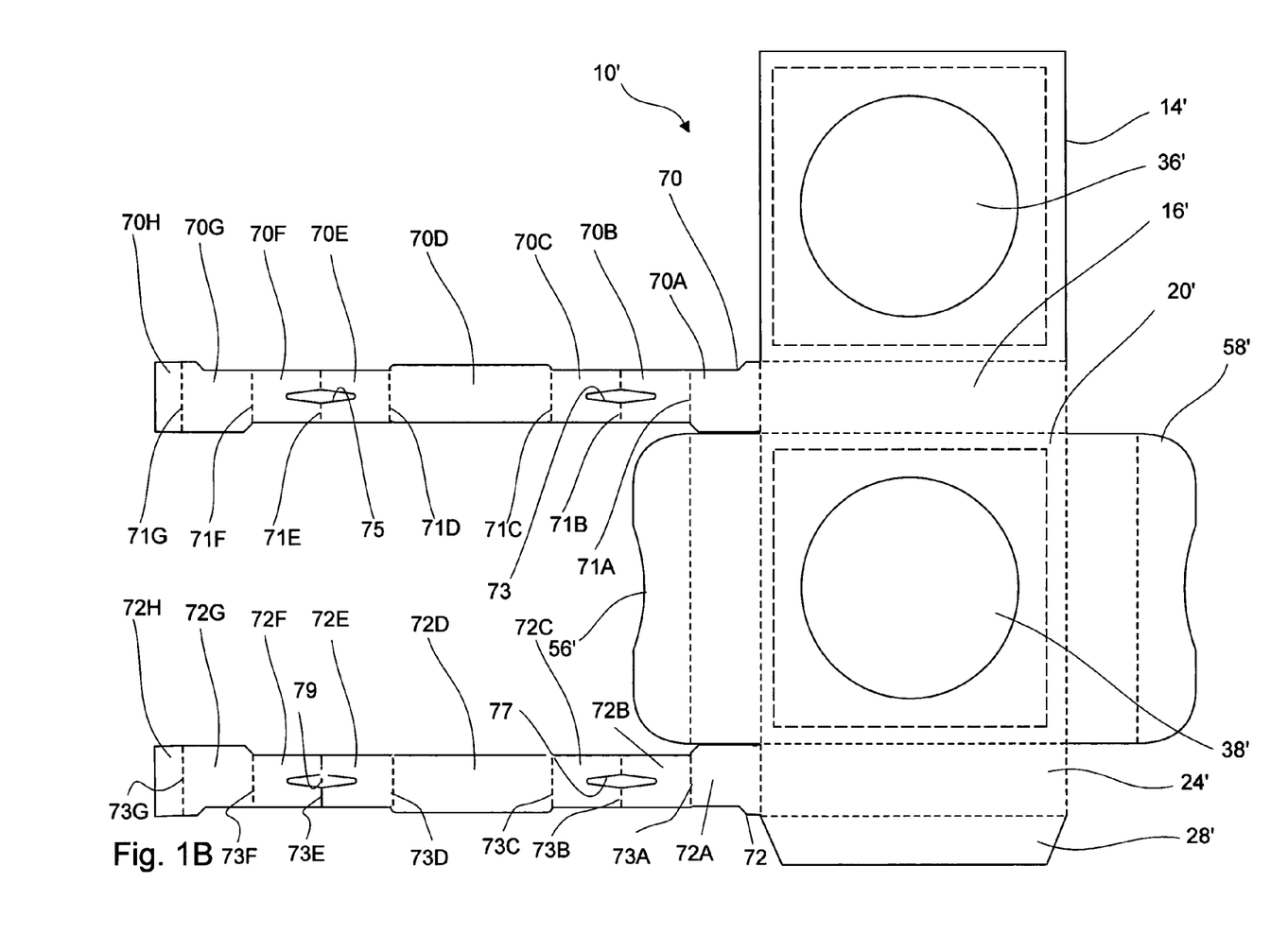
FIG. 1B is a plan view of a second embodiment of the package in an opened configuration.
Figure 2A:
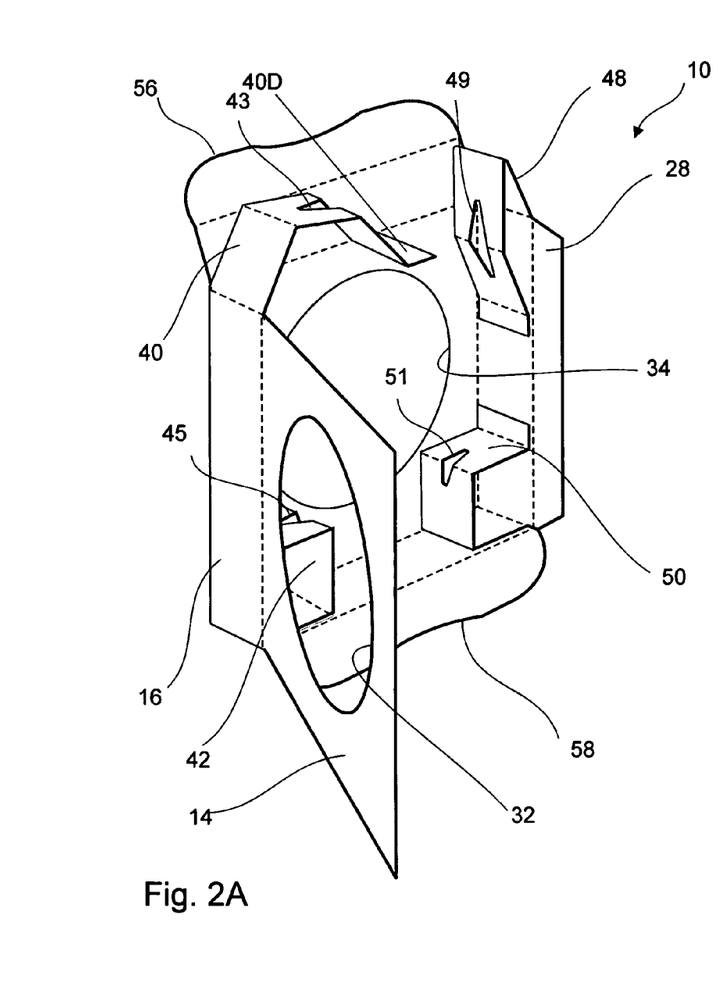
FIG. 2A is a perspective view of the package of FIG. 1A in a partially formed position.
Figure 2B:
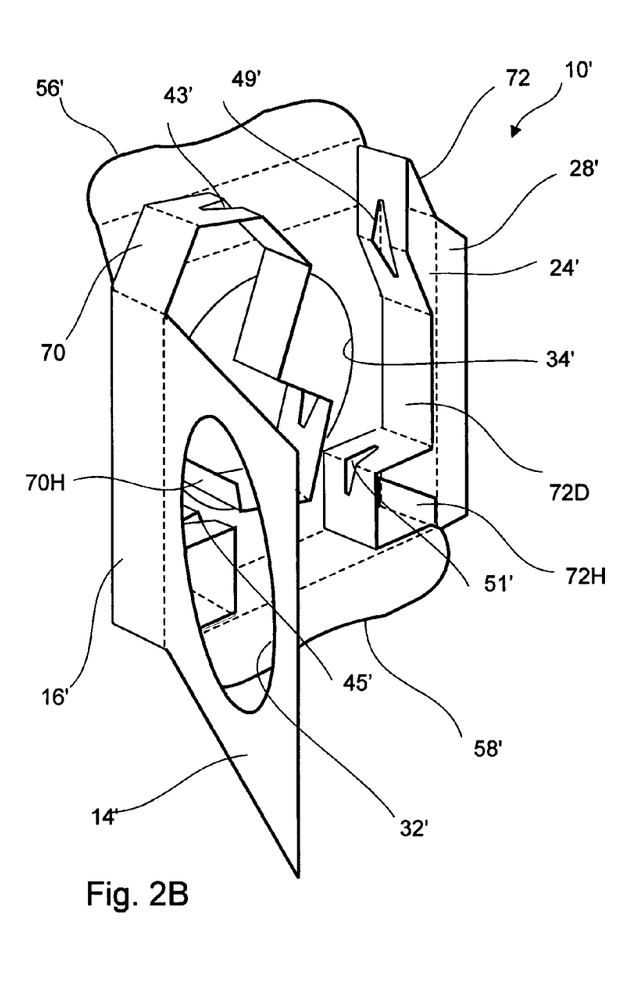
FIG. 2B is a perspective view of the package of FIG. 1B in a partially formed position.

A second embodiment is depicted in FIGS. 1B and 2B. Here, package 10' differs in that tabs 40, 42, 48, and 50 of package 10 are connected as shown such that there are only two tabs 70 and 72 which function similar to tabs 40, 42, 48, and 50. Tab 70 includes portions 70A, 70B, 70C, 70D, 70E, 70F, 70G, and 70H connected by fold lines 71A, 71B, 71C, 71D, 71E, 71F and 71G, respectively. Slotted surfaces 73, 75 and 77, 79 are formed in portions 70B and 70C and 70E and 70F, respectively. As seen in FIG. 2B, portions 72D and 72H are adhesively connected to panel 24' and portions 70D and 70H likewise connected to panel 16'. The package 10' is otherwise similarly formed as described above with respect to package 10.

Figure 1C:
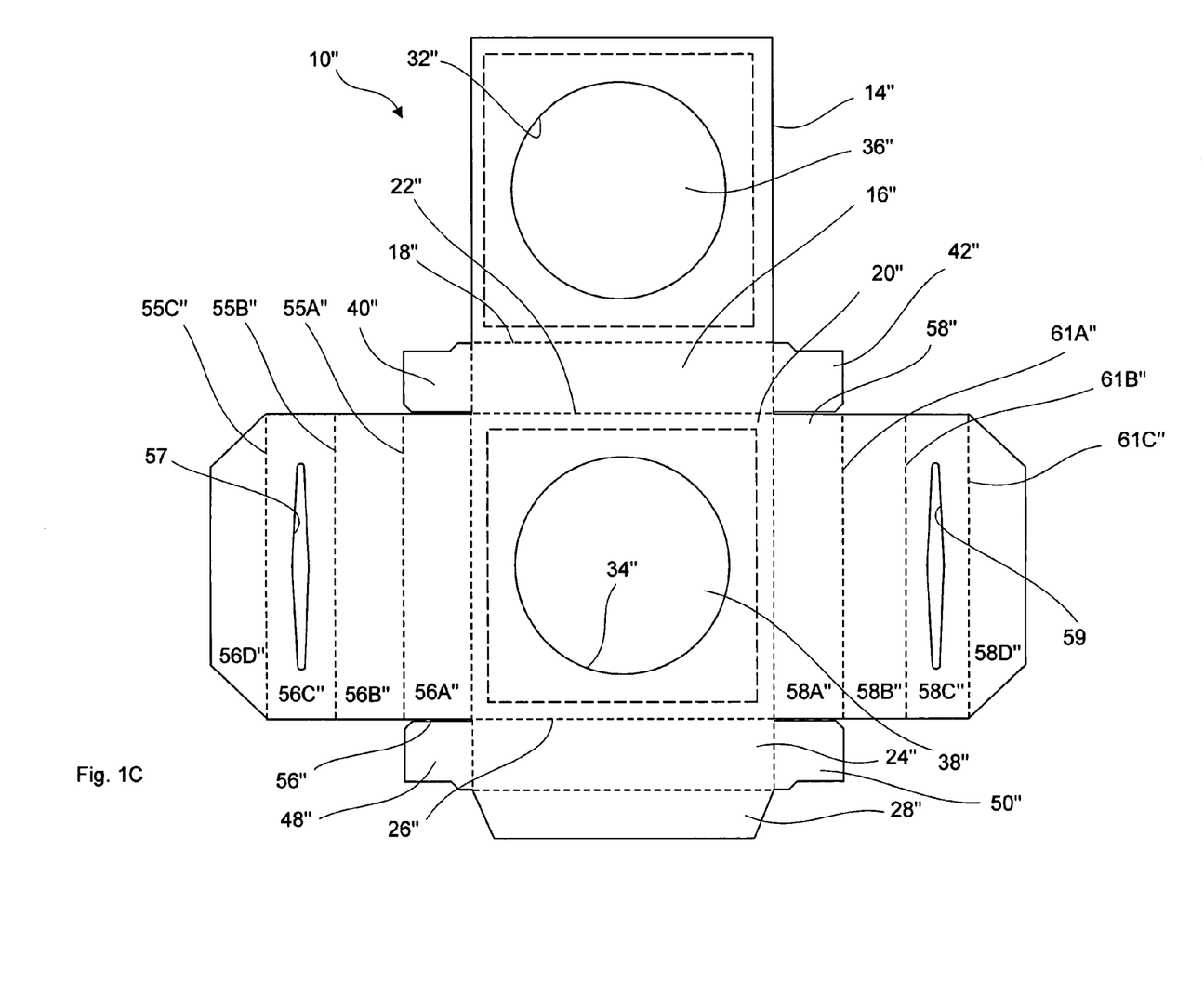
FIG. 1C is a plan view of a third embodiment of the package in an opened configuration.
Figure 2C:
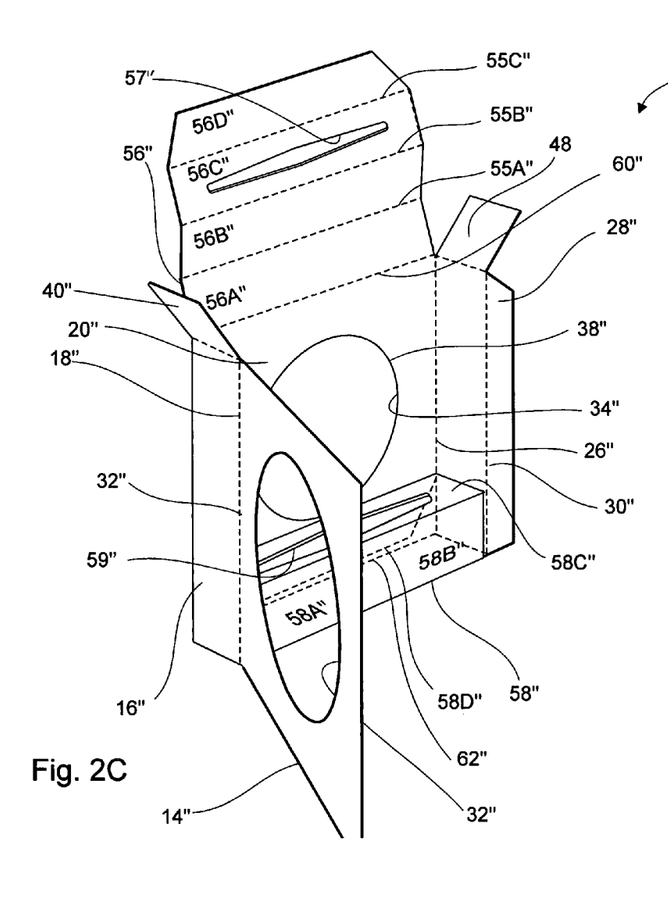
FIG. 2C is a perspective view of the package of FIG. 1C in a partially formed position.
Figure 6:
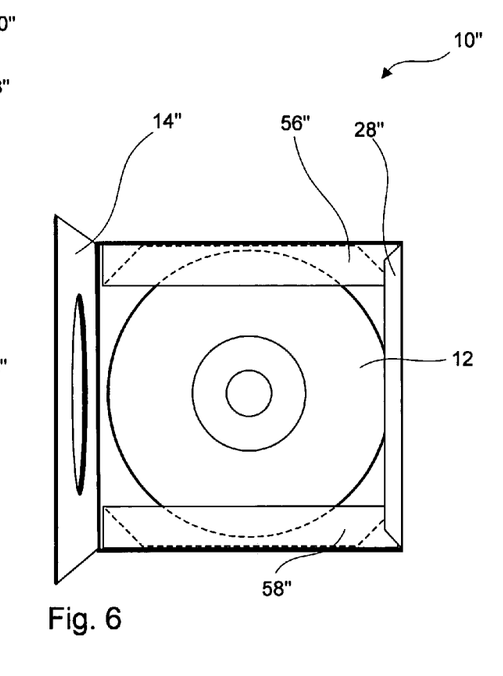
FIG. 6 is a sectional view of the package in FIG. 1C depicting complete insertion of an article with the package in a closed position.

A third embodiment is depicted in FIGS. 1C, 2C and 6, wherein the package 10" differs form the package 10 in that the flap portions 56" and 58" and tabs 40", 42", 48" and 50". Here, the flap portions 56" and 58" substantially mirror one another. For simplicity, flap portion 56" is described. Flap portion 56" includes an inner portion 56A", first intermediate portion 56B", second intermediate portion 56C" and outer portion 56D". The second intermediate portion 56C" includes an elongated slotted surface 57".

Similar to previously described assembly, the package 10" here can be assembled as follows. The outer portion 56D" is adhesively affixed to an inner face of third panel 20" such that fold line 55C" is disposed from fold line 55A' a distance substantially that of one side of intermediate portion 56B". The other flap portion 58" can be affixed in a similar manner. Also, flap portion 28" can be attached as previously described. As can be seen in FIGS. 2C and 6, intermediate portions 56C" and 58C" can form a shelf/support with the slotted surfaces 57" and 59" serving to retain a portion of the article 12. Tabs 40", 42', 48" and 50" can be inserted as beneath the inner portions 56A" and 58A" once the article 12 is inserted.

By so providing, the package 10, 10' and 10" enables direct application of printed indicia in a low cost material with conventional printing methods, such as four color offset printing to be employed. It is noted that the die cut can also have particular embossed features included thereon so that the three-dimensional relief corresponding to that die can be transferred to the finished package. Other modifications of this invention beyond these embodiments specifically described herein may be made without departing from the spirit of the invention. Accordingly, such modifications are considered within the scope of the invention as limited solely by the appended claims.

What is claimed is:

1. A package for storing a fragile article, which includes:
   a first panel;
   a second panel integrally connected to the first panel along a first fold line;
   a third panel integrally connected to the second panel along a second fold line;
   a fourth panel integrally connected to the third panel along a third fold line; the fourth panel fixably connected to the first panel such that the first panel and the third panel oppose one another in a spaced relation and the second panel and the fourth panel oppose one another in a spaced relation and wherein the panels form a partial enclosure having a first open end surface and a second open end surface;
   a pair of first tabs connected to said first panel wherein one of the first tabs connects adjacent to one end of the first panel adjacent the first open end surface and another of the first tabs connects adjacent to another end of the first panel adjacent the second open end surface and each first tab has a slotted surface forming a shelf therein which when the shelf extends inside of the partial enclosure provides a retention surface for a portion of the article; and
   a pair of second tabs connected to the third panel wherein one of the second tabs connects adjacent to one end of the third panel adjacent the first open end surface and another of the second tabs connects adjacent to another end of the third panel adjacent the second open end surface and each second tab has a slotted surface forming a shelf therein which when the shelf extends inside of the partial enclosure provides a retention surface for another portion of the article;
   a first end panel having a portion connecting to the second panel and a portion removably disposed in a slot formed between the fourth panel and the first tab and the second tab adjacent the first open end surface and to enclose the first tab and the second tab adjacent the first open end surface in a manner which permits reusable closing and opening the first end panel and reuse of the package;
   a second end panel having a portion connecting to one of the second panel and fourth panel and a portion removably disposed in a slot formed between the fourth panel and the first tab and the second tab adjacent the second open end surface and to enclose the first tab and the second tab adjacent the second open end surface in a manner which permits reusable closing and opening the second end panel and reuse of the package; and
   wherein the panels form and a complete enclosure wherein the article is removably retained between the shelves in suspended manner in a spaced relation from each of the panels and wherein the end panels are openable such that the tabs are readily collapsible to extend outside one of the open end surfaces to permit ready insertion and removal of the article through said open end surfaces.

2. The package for storing a fragile article of claim 1, wherein the package is integrally formed in a single die cut.

3. The package for storing a fragile article of claim 1, wherein at least one of the panels includes a window through which the article can be viewed.

4. The package for storing a fragile article of claim 1, wherein the package is made of a material which enables direct printing thereon.

5. The package for storing a fragile article of claim 3, wherein the window includes a translucent member to prevent entry into the enclosure and thereby protect the article.

6. The package for storing a fragile article of claim 1, wherein the first panel and the third panel are geometrically substantially similar and the second panel and the fourth panel are geometrically substantially similar.

7. The package for storing a fragile article of claim 1, wherein the first, second, third and fourth panels are rectangular.

8. A package for storing a fragile article, which includes:
   a first panel;
   a second panel integrally connected to the first panel along a first fold line;
   a third panel integrally connected to the second panel along a second fold line;
   a fourth panel integrally connected to the third panel along a third fold line; the fourth panel fixably connected to the first panel such that the first panel and the third panel oppose one another in a spaced relation and the second panel and the fourth panel oppose one another in a spaced relation and wherein the panels form a partial enclosure having a first open end surface and a second open end surface;
   a first flap having a plurality of interconnected portions separated by fold lines wherein a first of the portions connects to the second panel in a manner to enclose the first open end surface, a second of the portions contacts the fourth panel, a third of the portions extends between the second panel and the third panel having a slotted surface therein forming a shelf to retain part of the article in a manner which permits reusable closing and opening the first flap and reuse of the package; and
   a second flap having a plurality of interconnected portions separated by fold lines wherein a first of the portions connects to the second panel in a manner to enclose the first open end surface, a second of the portions contacts the fourth panel, a third of said portion extends between the second panel and the third panel having a slotted surface therein forming a shelf to retain part of the article in a manner which permits reusable closing and opening the first flap and reuse of the package; and
   wherein the panels and flaps form a complete enclosure about the article which is retained between the shelves in suspended manner in a spaced relation from each of the panels.

9. The package for storing a fragile article of claim 8, wherein the package is integrally formed in a single die cut.

10. The package for storing a fragile article of claim 8, wherein at least one of the panels includes a window through which the article can be viewed.

11. The package for storing a fragile article of claim 8, wherein the package is made of a material which enables direct printing thereon.

12. The package for storing a fragile article of claim 10, wherein the window includes a translucent member to prevent entry into the enclosure and thereby protect the article.

13. The package for storing a fragile article of claim 8, wherein the first panel and the third panel are geometrically substantially similar and the second panel and the fourth panel are geometrically substantially similar.

14. The package for storing a fragile article of claim 9, wherein said slotted surfaces are configured of a size to only contact a peripheral surface of the article.

15. The package for storing a fragile article of claim 1, wherein said slotted surfaces are configured of a size to only contact a peripheral surface of the article.

16. The package for storing a fragile article of claim 8, wherein the first, second, third and fourth panels are rectangular.

\* \* \* \* \*